US009981369B2

(12) United States Patent
Hohmann et al.

(10) Patent No.: US 9,981,369 B2
(45) Date of Patent: May 29, 2018

(54) TENSIONING DEVICE FOR EXPANDING A THREADED BOLT

(71) Applicants: Frank Hohmann, Warstein (DE); Jörg Hohmann, Meschede (DE)

(72) Inventors: Frank Hohmann, Warstein (DE); Jörg Hohmann, Meschede (DE)

( * ) Notice: Subject to any disclaimer, the term of this patent is extended or adjusted under 35 U.S.C. 154(b) by 368 days.

(21) Appl. No.: 14/702,784

(22) Filed: May 4, 2015

(65) Prior Publication Data
US 2015/0314431 A1    Nov. 5, 2015

(30) Foreign Application Priority Data
May 5, 2014   (DE) .................. 10 2014 106 215

(51) Int. Cl.
B25B 29/02       (2006.01)
B23P 19/06       (2006.01)

(52) U.S. Cl.
CPC ............ *B25B 29/02* (2013.01); *B23P 19/067* (2013.01)

(58) Field of Classification Search
CPC ................ B25B 29/02; B23P 19/067
See application file for complete search history.

(56) References Cited

U.S. PATENT DOCUMENTS

2008/0173140 A1* 7/2008 Hohmann ............ B23P 19/067
                                                         81/57.44
2010/0175240 A1* 7/2010 Wagner ................ B23P 19/067
                                                         29/407.08

FOREIGN PATENT DOCUMENTS

WO    2013/117807 A1    8/2013
WO    2014/122356 A1    8/2014

* cited by examiner

Primary Examiner — Christopher M Koehler
Assistant Examiner — Joel Crandall
(74) Attorney, Agent, or Firm — Gudrun E. Huckett

(57) ABSTRACT

A tensioning device for stretching a threaded bolt by applying tension to the threaded portion of the threaded bolt has a base and a support tube surrounding the threaded bolt and supported on the base. A cylinder housing is arranged as an axial extension on the support tube. A piston is moveably arranged in the cylinder housing and delimits together with an inner wall of the cylinder housing a hydraulic operating chamber. An interchangeable bush is rotatable relative to the piston and can be entrained axially by the piston. The interchangeable bush has an internal thread to establish a screw connection to the threaded portion. A device for path and/or position detection with first and second interacting elements is provided. The first element is fastened to the at least one piston and faces the cylinder housing. The second element is fastened to the cylinder housing and faces the piston.

10 Claims, 2 Drawing Sheets

TENSIONING DEVICE FOR EXPANDING A THREADED BOLT

BACKGROUND OF THE INVENTION

The invention relates to a tensioning device for expanding or stretching a threaded bolt as a result of tension on the threaded portion thereof. The tensioning device comprises
- a support tube which surrounds the threaded bolt and which is supported against a base which surrounds the threaded bolt as an abutment,
- a cylinder housing which is arranged in the extension of the support tube having at least one piston which is movable therein in the longitudinal direction and delimits a hydraulic operating chamber together with an inner wall of the cylinder housing,
- an interchangeable bush which is rotatable in relation to the piston, is realized so as to be able to be entrained axially by the piston and is provided with an internal thread for screw-connection to the threaded portion of the threaded bolt,
- and a device for path and/or position detection which is comprised of two interacting elements.

A hydraulically operating threaded bolt tensioning device with said features is known from WO 2013/117807 A1. It serves for tightening screw connections or threaded bolts which are subject to high stresses. Using hydraulic pressure, a high tensile force can be applied temporarily onto the threaded bolt in order to tighten or re-tighten at the same time the nut fitted on the threaded bolt in a torsion-free manner. To this end, an interchangeable bush is screwed onto the threaded portion of the threaded bolt which projects beyond the nut. The interchangeable bush communicates axially with a hydraulically driven piston. When hydraulic pressure is introduced, the piston is raised and entrains the interchangeable bush, as a result of which the threaded bolt is pulled a little in the longitudinal direction and at the same time is also stretched. In order to gain information during the tensioning process concerning the movement of the interchangeable bush and consequently of the bolt end screwed into the interchangeable bush, the interchangeable bush is provided with a magnetic strip in the region of its threaded engagement into the threaded bolt. An electric sensor, by way of which the longitudinal movement of the magnetic strip is able to be measured, is arranged at approximately the same height in the cylinder housing of the tensioning device.

Good measurement results can be achieved in most cases with the known tensioning device. However, false results can arise in situations in which light torques act on the cylinder housing. This is typically the case when the device is not used for perpendicular screw connections but at an angle or even in a horizontal tensioning direction. For asymmetries at the housing or the periphery, for instance the hydraulic supply connected on one side of the cylinder housing, can lead to the cylinder housing rotating a little about the tensioning axis with a decrease in the hydraulic pressure, and in this case also resulting in the interchangeable bush which is screwed onto the bolt end twisting slightly. Said interchangeable bush or the magnetic strip fastened thereon is no longer able to supply the sensor with a reliable position.

Consequently, it is the object of the invention to obtain reliable measurement results even in such particular situations.

SUMMARY OF THE INVENTION

To achieve this, a tensioning device of the aforementioned kind for expanding or stretching a threaded bolt as a result of tension applied to the threaded portion of the threaded bolt is proposed wherein the first element is fastened on the piston facing the cylinder housing and the second element is fastened on the cylinder housing facing the piston.

The tensioning device uses, as is known in the prior art, a device for path and/or position detection in the tensioning direction which is comprised of two interacting elements, however one of said elements is not situated on the interchangeable bush but directly on the piston. As a result of measuring on the piston and consequently on the component exposed to the hydraulic pressure, more reliable conclusions are possible in certain situations regarding the bolt extension achieved during the tensioning process than by path or position detection of the interchangeable bush, although in theory the interchangeable bush, as it is the component "closer" to the threaded bolt, should provide the more accurate results. This does not apply, however, in all situations (see above).

The two elements of the device for path and/or position detection can be located radially opposite one another with reference to the tensioning axis.

The first element is preferably arranged on the piston in a ring-shaped form around said piston. The advantage of this is that during the assembly of the tensioning device, once the piston has been inserted, the rotational position of the piston is insignificant to the operation of the device for path and/or position detection.

The first element of the device is a magnetic strip, for example, or an arrangement of several grooves which are realized in the circumferential surface of the piston.

The second element is preferably a sensor or a receiver. This is preferably arranged in an opening or recess of the cylinder housing which extends only over a small part of the overall circumference of the cylinder housing in order not to weaken the strength thereof.

Further details and advantages are provided in the following description of exemplary embodiments which are illustrated in the drawings.

DESCRIPTION OF PREFERRED EMBODIMENTS

Figure 1:
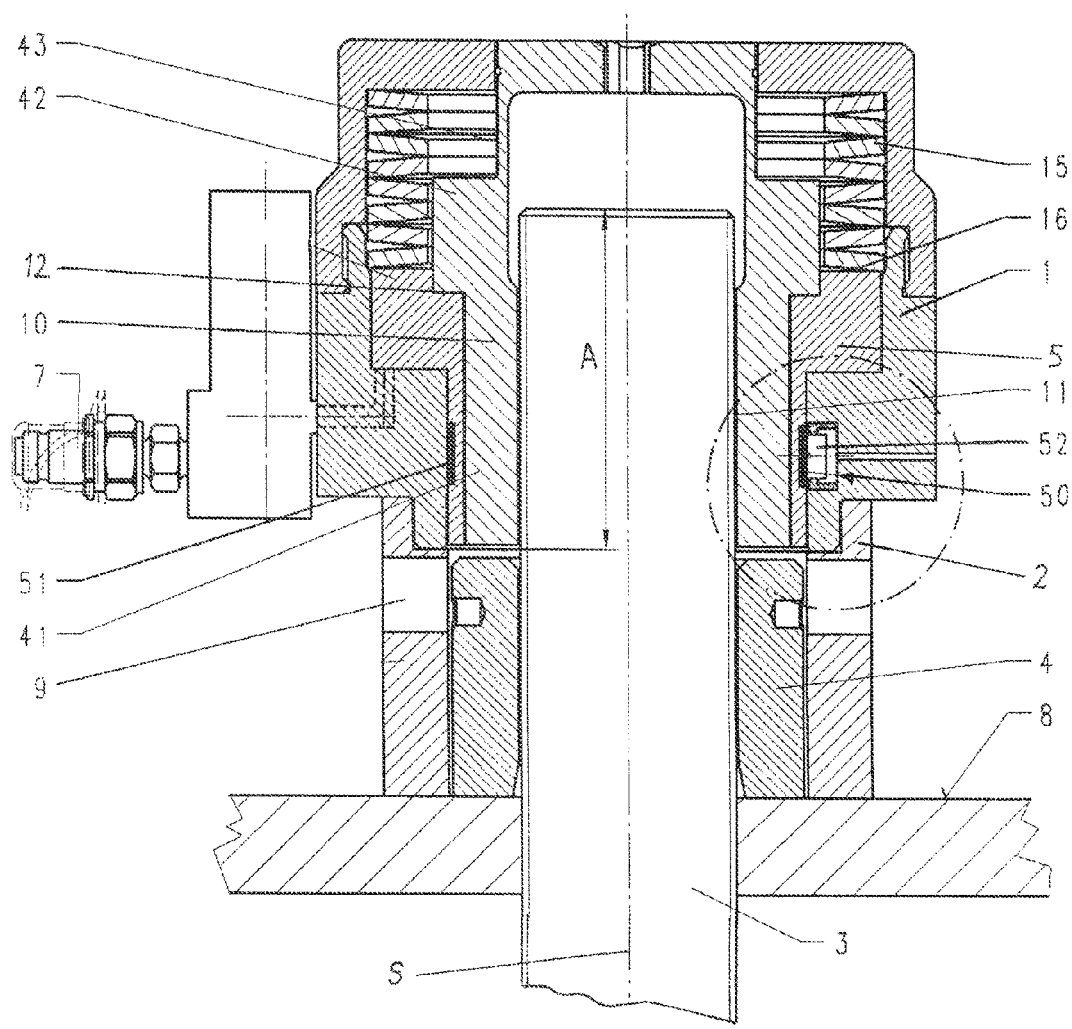
FIG. 1 shows a simplified sectional representation of a hydraulically operating threaded bolt tensioning device, fitted onto a threaded bolt and supported on a base, the tensioning device operating with a single-stage tensioning cylinder.

The hydraulically operated tensioning device serves for tightening and where applicable also releasing screw connections which are subject to high stresses. Using the tensioning device, a predetermined tensile force can be applied onto a bolt for a certain time in the longitudinal direction of the threaded bolt 3 in order to tighten or re-tighten at the same time the nut 4 of the screw connection which is screwed on the threaded bolt 3 and is supported on a surrounding base 8.

An interchangeable bush 10, which is arranged so as to be longitudinally movable inside the tensioning device, is screwed onto the threaded portion A of the threaded bolt 3 which protrudes beyond the nut 4, and is then put under tension hydraulically, as a result of which the threaded bolt 3 stretches in the longitudinal direction.

The tensioning mechanism is enclosed by a cylinder housing 1. This latter can be realized in one stage as in FIG. 1 or also for higher tensioning pressures, as shown in FIG. 2, can be assembled in a modular-like manner from two or more cylinder portions.

The rigid continuation of the cylinder housing 1 downward forms a support tube 2 which is supported on the base 8 and surrounds the nut 4. The support tube 2 can be a component which is separate with regard to the cylinder housing 1, but is rigid in relation to said cylinder housing.

The support tube 2 is open at its bottom surface and is supported on the base 8, in the majority of cases a machine part, on which the nut 4 is also supported. In addition, there is also a gear unit which operates through an opening in the support tube 2, by way of which the nut 4, which is screw connected onto the threaded bolt 3, is able to be rotated from the outside. Said rotating is naturally only possible when the tensioning device operates and the nut 4 is consequently not loaded by considerable friction on the base 8.

A hydraulic connection 7 is situated on the side of the cylinder housing 1, by means of which hydraulic connection 7 the hydraulic operating chamber of the tensioning device is connected in a manner controlled by valves to an external hydraulic supply which is controllable with regard to the operating pressure and the hydraulic pressure build-up, preferably by means of an electronic control and regulating unit.

Along the tensioning axis S, the cylinder housing 1 includes one hydraulic cylinder (FIG. 1) or, as an alternative to this, also two or more hydraulic cylinders (FIG. 2) which are connected to the controllable external hydraulic supply by means of the hydraulic connection 7 and a flexible, pressure-tight hydraulic line.

A piston 5, 5A, 5B is arranged so as to be movable in the direction of the tensioning axis S in each hydraulic cylinder. Whereas the interchangeable bush 10 is replaceable and, for example, can be removed from the tensioning device, the piston 5, 5A, 5B always remains in the tensioning device as it is part of the hydraulic system.

On account of the high pressures, the piston 5, 5A, 5B is sealed very well to the cylinder inner wall of the hydraulic cylinder. The quality of said seal results in the piston, although it comprises a cylindrical cross section just as the cylinder inner wall, being almost non-rotational in relation to the cylinder housing 1. In practice, at least within the framework of the individual tensioning process, there is no noteworthy rotation of the piston about the tensioning axis S. In contrast, the non-sealed interchangeable bush 10 is rotatable in relation to the cylinder housing 1 and in relation to the piston 5, 5A, 5B.

Figure 2:
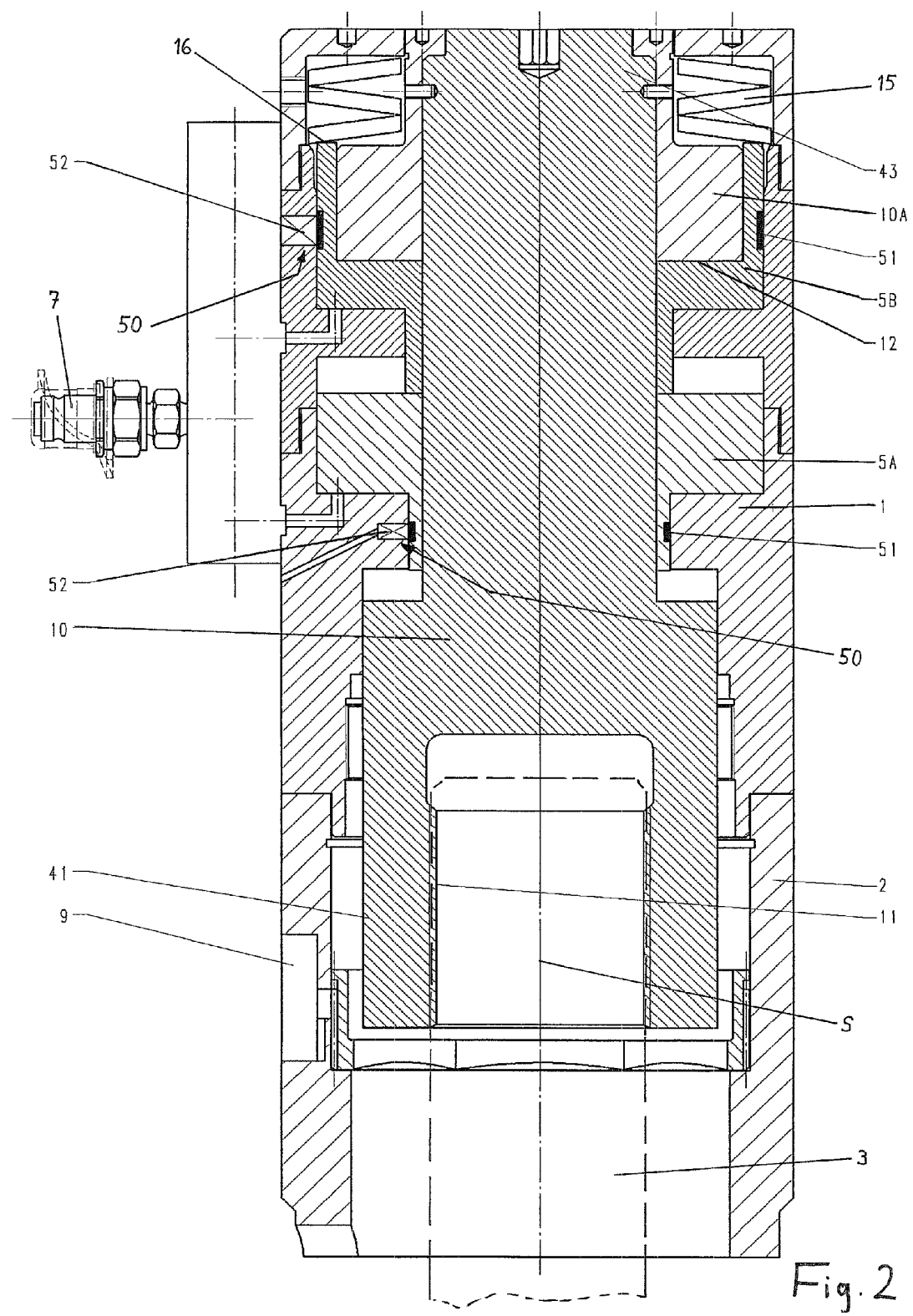
FIG. 2 shows another embodiment of a hydraulically operating threaded bolt tensioning device, said tensioning device operating with a two-stage tensioning cylinder.

In the case of the exemplary embodiment shown in FIG. 1, there is only one cylinder stage and consequently only one piston 5 and in the case of the second exemplary embodiment shown in FIG. 2 there are two cylinder stages and consequently also two cylinder pistons 5A, 5B. It is also possible to have a multiple-stage tensioning cylinder with three or more pistons. The hydraulic piston 5 is raised or the hydraulic pistons 5A, 5B are raised as a result of feeding hydraulic pressure into the operating chamber or chambers.

The raising is effected in opposition to the compressive force of a spring arrangement 15. The spring arrangement 15 is preferably comprised of one or several plate springs which are arranged in a ring-shaped manner around the piston 5 and are supported from above on the piston 5 or on the topmost piston 5B. A spring supporting means 16 is realized for this purpose on the piston 5 or 5B. The spring arrangement 15 consequently strives to hold the piston or pistons in its or their initial position in which the hydraulic operating chamber is at its minimum.

The piston is ring-shaped and is provided with a stage which forms a ring surface which faces the base 8. By way of said ring surface, the piston 5 or 5B is supported axially from below against a ring-shaped surface 12 which is realized directly on the interchangeable bush 10 (FIG. 1), or which is realized on a separate ring 10A which is screw-connected to the interchangeable bush 10 and is non-rotatably secured thereon (FIG. 2). In this way, the interchangeable bush 10 is realized so that it can be axially entrained by the piston 5 or 5B. At the same time, the interchangeable bush 10, in so far as the pressure conditions allow, is realized so as to be freely rotatable relative to the pistons 5, 5A, 5B.

Starting from the base 8, the interchangeable bush 10 is comprised of a first longitudinal portion 41, a second longitudinal portion 42, and a third longitudinal portion 43. As a result of material and cross sectional geometry, it is rigid in the axial direction in such a manner that even in the case of high hydraulic pressure it does not show any significant longitudinal deformation.

On the first longitudinal portion 41 the interchangeable bush 10 comprises a high-performance internal thread 11 which can be screwed onto the threaded portion A of the threaded bolt 3 as a result of rotating the interchangeable bush 10. The axial length of the internal thread 11 and consequently the available insertion depth should be at least the same as the threaded diameter of the bolt 2.

The second longitudinal portion 42 of the interchangeable bush 10, in the case of the embodiment according to FIG. 1, is developed as an integrally moulded collar on which the ring-shaped surface 12 is realized. The collar serves for axially supporting the interchangeable bush 10 on the piston 5. The second longitudinal portion 42 at the same time forms the portion of the interchangeable bush with the largest radius. In the case of the embodiment according to FIG. 2, the screw-connectable ring 10A forms the second longitudinal portion of the interchangeable bush.

The third longitudinal portion 43 is pin-shaped and has a smaller diameter than the second longitudinal portion 42 such that for rotating the interchangeable bush 10, this latter can be gripped by hand at the third longitudinal portion 43.

The tensioning device comprises a device 50 which is comprised of two interacting elements 51, 52 and by way of which a precise path and/or position detection of the piston 5 (FIG. 1) or of a piston 5A, 5B (FIG. 2) can be carried out.

Figure 1A:
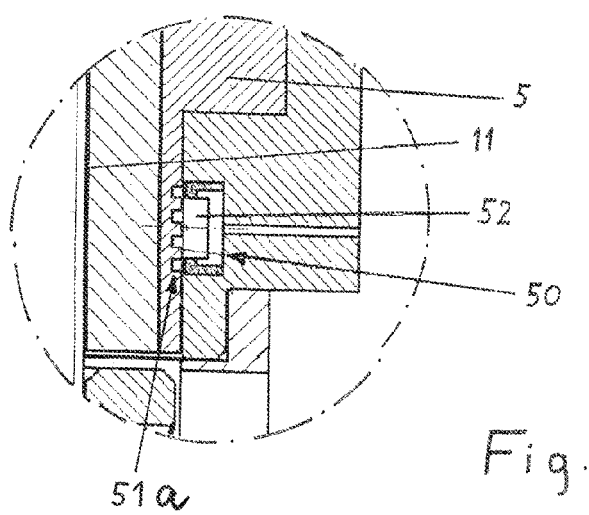
FIG. 1a shows a detail of the encircled area of FIG. 1 illustrating grooves as a first element of the device for path and/or position detection.

The first element 51 of the device 50, in this case, is a magnetic strip 51 which is mounted on the piston 5, 5A, 5B and surrounds the piston in a ring-shaped manner. As an alternative to this, a longitudinal portion of the piston 5, 5A, 5B can be magnetized and thus can be detected as regards length or path. As an alternative this, the first element 51 can be an arrangement, which can be sensed, of several circumferential grooves 51a which are realized in the outer surface of the piston (see FIG. 1a).

The second element 52 is preferably a sensor for detecting the longitudinal position of the first element 51 which is fastened on the cylinder housing 1 and faces the piston and consequently the first element 51.

The elements 51, 52 are located radially opposite one another with reference to the tensioning axis S of the cylinder housing 1, the second element 52 being arranged in an opening or a recess of the cylinder housing 1 which extends only over as small a part as possible of the circumference of the cylinder housing 1 in order not to compromise the strength thereof.

As a result of the described arrangement of the magnetic strip 51 and of the sensor 52, reliable path and/or position measurements can be carried out even in such situations in which torques act on the cylinder housing 1. This is typically the case when the device is not used for vertical screw connections, but at an angle or even in a horizontal tensioning direction. For asymmetries in the weight distribution of the device, but in particular tensile or weight forces on account of the hydraulic connection 7 being fastened on only one side of the cylinder housing 1, can lead to the cylinder housing 1 rotating a little about the tensioning axis S with a decrease in the hydraulic pressure. If, in this case, the interchangeable bush 10, which is screw-connected onto the threaded portion A, should twist slightly, said interchangeable bush or a magnetic strip fastened thereon can no longer supply any reliable position values.

The fact that the piston 5, 5A, 5B is sealed very well toward the cylinder inner wall of the hydraulic cylinder contributes toward the emergence of said situation, as a result of which the piston behaves almost non-rotatably in relation to the cylinder housing 1. If the cylinder housing 1 is rotated about the tensioning axis S, the piston is rotated practically to the same extent at the same time. At all events, within the framework of the individual tensioning process, there is no twisting of the piston relative to the housing 1. Contrary to this, the non-sealed interchangeable bush 10 is rotatable in relation to the housing 1 and in relation to the piston.

In order to arrive at reliable measuring results even in the described situations, the first element 51 of the device 50 for path and/or position detection is not situated on the interchangeable bush 10, but directly on the piston 5, 5A, 5B. This latter is the component exposed directly to the hydraulic pressure and in the described situations allows more reliable conclusions regarding the bolt elongation achieved during the tensioning process than is possible as a result of measuring on the interchangeable bush although, in theory, the interchangeable bush 10, as it is the component that is "closer" to the threaded bolt 3, should supply the more accurate results.

In the case of the embodiment according to FIG. 2, as shown with reference to the bottom piston 5A, the magnetic strip 51 or an arrangement of several circumferential grooves can either be in the form of a circumferential ring or fastened on said bottom piston, or as an alternative to this, as also shown in FIG. 2, on the top piston 5B.

The sensor 52 is connected for signalling to the electronic control and regulating unit which controls the tensioning device with regard to the operating pressure and the build-up of hydraulic pressure. The signal connection can be effected either by means of a cable or by means of a radio connection.

Within the context of the here preferred hydraulic tensioning method, length measuring is only effected starting from a tensioning pressure which is to be defined beforehand. The length or length position of the magnetic strip 51 which is detected by the sensor 52 is converted into a force in the processor of the electronic control and regulating unit, and from this is determined the force which prevails in the threaded bolt 3 once the nut 4 has been fitted in the threaded bolt 3.

This is explained below by way of an example. When the hydraulic pressure is 0 bar, the elongation detected by means of the device 50 is also 0 mm. When the tensioning pressure is 50 bar, the elongation detected in this manner is 0.03 mm.

In the case of an end pressure of 1.351 bar (2.879 KN), the elongation is 0.8 mm. Once said end pressure has been reached, the nut 4 is fitted by means of the gear unit which operates through the opening 9 in the support tube 2. The pressure is then relieved to 0 bar. As a result of resetting the piston, in particular as a result of the influence of the spring arrangement 15, the pistons 5 or 5A, 5B move back into their initial position without being rotated.

Then in a further step the pressure is raised once again, e.g. up to a pressure of 50 bar. If, in this connection, an elongation of 0.68 mm is calculated, the following calculation is carried out in the control and regulating unit:

0.68 mm−0.03 mm=0.65 mm      Effective elongation:

$F$=0.65/0.8×2897 KN=2353 KN      Force calculation:

The calculated force can also be displayed directly on the tensioning device. To this end, a corresponding visual display which is supplied by means of a battery can be arranged on top of the cylinder housing 1. It is also possible, in particular, to control the pump of the hydraulic pump automatically using the described tensioning device in dependence on the sensed and calculated values.

The detecting of the length or the position of the piston can also be effected, apart from by means of the magnetic sensor system, by other types of length or position detection, e.g. by means of grooves which are arranged over the circumference of the piston, are detected by a sensor that is fastened on the cylinder housing 1 and are converted into length signals in the control unit.

The specification incorporates by reference the entire disclosure of German priority document 10 2014 106 215.9 having a filing date of May 5, 2014.

While specific embodiments of the invention have been shown and described in detail to illustrate the inventive principles, it will be understood that the invention may be embodied otherwise without departing from such principles.

LIST OF REFERENCE CHARACTERS

1 Cylinder housing
2 Support tube
3 Threaded bolt
4 Nut
5 Piston
5A Piston
5B Piston
7 Hydraulic connection
8 Base
9 Opening
10 Interchangeable bush
10A Ring
11 Internal thread
12 Stage
15 Spring arrangement
16 Spring support
41 First longitudinal portion
42 Second longitudinal portion
43 Third longitudinal portion
50 Device for path and/or position detection
51, 51a First element, magnetic strip or grooves
52 Second element, sensor
A Threaded portion
S Tensioning axis

What is claimed is:

1. A tensioning device for stretching a threaded bolt by applying tension on the threaded portion of the threaded bolt, the tensioning device comprising:

a base surrounding the threaded bolt;

a support tube surrounding the threaded bolt and supported on the base that forms an abutment for the support tube;

a cylinder housing arranged on the support tube and forming an axial extension of the support tube;

at least one piston arranged in the cylinder housing so as to be moveable in an axial direction of the at least one piston, wherein the at least one piston and an inner wall of the cylinder housing together delimit a hydraulic operating chamber;

an interchangeable bush rotatable relative to the at least one piston and configured to be entrained in the axial direction by the at least one piston, wherein the interchangeable bush comprises an internal thread configured to establish a screw connection to the threaded portion of the threaded bolt;

a detection device comprising a first element and a second element that interact with each other as a sensor and an element to be sensed by the sensor, the first element fastened to the at least one piston and facing the cylinder housing and the second element fastened to the cylinder housing and facing the at least one piston, wherein the detection device is selected from the group consisting of a path detection device, a path and position detection device, and a position detection device.

2. The tensioning device according to claim 1, wherein the first element is ring-shaped and surrounds the at least one piston.

3. The tensioning device according to claim 2, wherein the first element is a magnetic strip.

4. The tensioning device according to claim 2, wherein the first element is a magnetisable portion of the piston.

5. The tensioning device according to claim 2, wherein the first element comprises an arrangement of several grooves provided in a circumferential face of the at least one piston.

6. The tensioning device according to claim 1, wherein the second element is arranged in a recess of the cylinder housing, wherein the recess extends only over a small part of an entire circumference of the cylinder housing.

7. The tensioning device according to claim 6, wherein the second element is the sensor.

8. The tensioning device according to claim 1, wherein the interchangeable bush is arranged so as to be rotatable in the cylinder housing.

9. The tensioning device according to claim 1, wherein the interchangeable bush is rotatable relative to the at least one piston.

10. The tensioning device according to claim 9, further comprising a ring screwed onto the interchangeable bush, wherein the at least one piston abuts the ring to entrain axially the interchangeable bush.

* * * * *